United States Patent
Coty et al.

(10) Patent No.: US 7,453,835 B1
(45) Date of Patent: Nov. 18, 2008

(54) ARRANGEMENT FOR OVERLAYING OPTICAL (SUCH AS FSO) AND RADIO FREQUENCY (SUCH AS WIMAX) COMMUNICATIONS NETWORKS

(75) Inventors: Constance Jean Coty, Whitehouse Station, NJ (US); Hossein Eslambolchi, Los Altos Hills, CA (US); Behzad Nadji, Los Gatos, CA (US); Mostafa Tofighbakhsh, Cupertino, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 674 days.

(21) Appl. No.: 11/105,959

(22) Filed: Apr. 14, 2005

(51) Int. Cl.
*H04B 7/00* (2006.01)
(52) U.S. Cl. .................... 370/310; 398/115
(58) Field of Classification Search .............. None
See application file for complete search history.

(56) References Cited

U.S. PATENT DOCUMENTS

| | | | |
|---|---|---|---|
| 5,381,546 A * | 1/1995 | Servi et al. ................ 718/102 |
| 6,725,160 B1 | 4/2004 | Johnson et al. | |
| 6,763,195 B1 | 7/2004 | Willebrand et al. | |
| 6,842,439 B2 * | 1/2005 | Zeitfuss ................... 370/328 |
| 7,349,635 B2 * | 3/2008 | Chuah et al. ............... 398/163 |
| 2002/0122230 A1 | 9/2002 | Izadpanah et al. | |
| 2003/0058827 A1 * | 3/2003 | Chow et al. ............... 370/338 |
| 2003/0100307 A1 * | 5/2003 | Wolochow et al. .......... 455/440 |
| 2004/0208591 A1 * | 10/2004 | Willebrand et al. ........ 398/115 |
| 2006/0025151 A1 * | 2/2006 | Karaoguz et al. .......... 455/455 |
| 2006/0038878 A1 * | 2/2006 | Takashima et al. ........ 348/14.08 |
| 2006/0168454 A1 * | 7/2006 | Venkatachary et al. ..... 713/182 |
| 2007/0242955 A1 * | 10/2007 | Kavehrad ................. 398/130 |
| 2008/0008150 A1 * | 1/2008 | Chow et al. ............... 370/338 |

\* cited by examiner

*Primary Examiner*—Ajit Patel

(57) ABSTRACT

An integrated communications network includes a free space optics network and a radio frequency network. A first method provides Classes of Service (CoS) to a subscriber located among regions defined by respective transmission bandwidth capabilities. The first method involves monitoring in which region the subscriber is located, and determining at least one possible CoS that can be provided using at least one of the FSO and RF networks, based on a transmission bandwidth capability of the region in which the subscriber is located. Another method involves comparing projected costs of possible CoSs, and selecting a CoS to provide to the subscriber. A load balancing and resource sharing method involves determining whether or not to provide additional bandwidth capacity in, or to re allocate bandwidth capacity among, transceivers in FSO and RF networks, in clusters of the transceivers, or in aggregates of the clusters of the transceivers.

18 Claims, 12 Drawing Sheets

ARRANGEMENT FOR OVERLAYING OPTICAL (SUCH AS FSO) AND RADIO FREQUENCY (SUCH AS WIMAX) COMMUNICATIONS NETWORKS

BACKGROUND OF THE INVENTION

1. Field of the Invention

The invention relates to arrangements for providing a seamless, integrated network that combines advantages of high data rates, wide area coverage, robustness and mobility support. More specifically, the invention relates to combined networks that seamlessly overlay optical (for example, FSO) and radio frequency (for example, WiMAX) networks, taking advantages of the best features of each technology.

2. Related Art

Free space optics (FSO) and WiMAX communication technologies are known in the art.

FSO involves transmission of low-powered multi-wavelength laser beams through the atmosphere, sending optical signals through the air using lenses and mirrors to focus and redirect the beams. Whereas FSO supports extremely high data rates, it is a line-of-sight (LoS) technology, so that atmospheric conditions such as fog, rain, heavy snow, and other airborne particulates clouds can hinder or bring down FSO transmissions. Moreover, the range of FSO signals is limited as compared to radio frequency (RF) technologies. Further, FSO is generally a point-to-point (PtP) technology, that, especially coupled with its LoS characteristics, have traditionally made it difficult to use with mobile transceivers.

In contrast, Worldwide Interoperability for Microwave Access (IEEE 802.16, or WiMAX,) is a point-to-multipoint (PtM) broadband wireless network communications standard. Essentially a wireless metropolitan area network (WMAN) radio frequency (RF, especially microwave) technology, WiMAX can, for example, connect IEEE 802.11 (WiFi) hotspots to the Internet. WiMAX-compliant stations can have a 50-km communications radius, and so can provide a unified metropolitan area network and allow true wireless mobility without the limitations of WiFi's "hot-spot hopping." Advantageously, WiMAX allows subscribers connectivity without a direct line of sight (LoS) to a base station and is thus a non-LoS (NLoS) technology. However, WiMAX is characteristic of RF technologies in that its data rate is lower than optical systems.

It is known in the art to hybridize optical and RF technology, but apparently, only in a rudimentary or piecemeal way. U.S. Pat. No. 6,763,195 (Willebrand et al.) discloses a hybrid communication link in which an optical link provides a primary data path, and in which an RF link provides a concurrent or backup path for the network data as well as a reliable and primary path for the control and status information. U.S. Pat. No. 6,725,160 (Johnson et al.) discloses a system for measuring performance of FSO and wireless HF in different stressor (weather) conditions, which "could be designed to test various communication systems during various weather conditions to find optimum technologies and equipment for each of the weather conditions. In some cases, a hybrid system can be developed that combines these optimum systems, and that subsequently uses the optimum system based on the actual weather conditions in the field." U.S. Patent Application Publication No. 2002/0122230 (Izadpanah et al.) discloses a hybrid wireless and optical communication link having a controller that responds to atmospheric conditions and causes switching between a laser portion and an RF portion. However, none of the conventional systems make use of the best features of both optical and RF technologies, and none provide a seamless network overlaying optical and RF technologies.

The inventors have realized that it would be desirable to combine, in a single network, the high data rate capability of FSO with the range, coverage, robustness and mobility support of WiMAX. However, conventional arrangements have not provided these combined advantages in a seamless, unified network solution. Therefore, there is a need in the art for an arrangement that combines optical data transmission rates, with the range, coverage, robustness and mobility support of RF (for example, WiMAX) networks.

SUMMARY

In an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways, the invention provides a method of providing Classes of Service (CoS) to a subscriber located among plural regions that are defined by plural respective transmission bandwidth capabilities. The method involves monitoring which region the subscriber is located in; determining at least one possible CoS that can be provided to the subscriber using at least one of the FSO and RF networks, based on a transmission bandwidth capability of the region in which the subscriber is located; and providing a CoS to the subscriber from among the possible CoSs determined in the determining step.

In an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways, the invention also provides a method of providing a communication service to a subscriber that includes ascertaining plural possible Classes of Service (CoSs) that can be provided to the subscriber using at least one of the FSO and RF networks; comparing respective projected costs of the plural possible CoSs; and selecting a CoS to provide to, the subscriber from among the plural possible CoSs, based at least in part on the comparison of the respective projected costs of the plural possible CoSs.

In an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways, the invention further provides a load balancing and resource sharing method. The method includes determining whether or not to provide additional bandwidth capacity in, or to re allocate bandwidth capacity among, transceivers in the FSO and RF networks, in clusters of the transceivers, or in aggregates of the clusters of the transceivers; and providing the additional bandwidth capacity or re allocating the bandwidth capacity determined in the determining step.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIG. 5 is a flowchart of one embodiment of a method by which subscribers may be dynamically provided with different classes of service, based at least in part on which bandwidth region (see FIG. 3) the subscriber is in;

DETAILED DESCRIPTION

Figure 1:
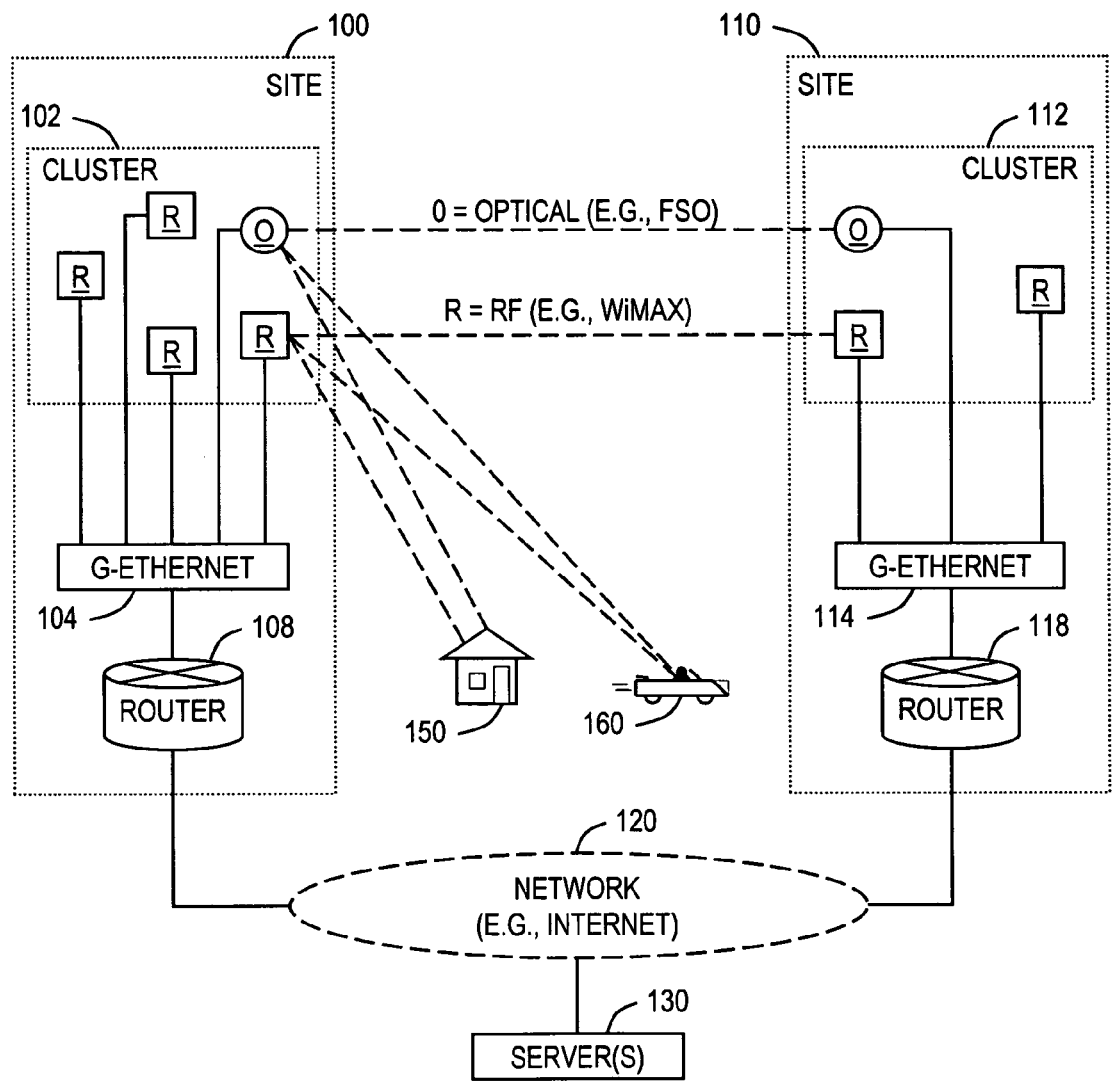
FIG. 1 illustrates how radio frequency (RF, for example, WiMAX) and optical (for example, free space optics, FSO) networks may be overlaid to form a composite communications network that communicates with stationary subscribers 150 and mobile subscribers 160.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, the selection, construction and/or use of elements employed in optical communications (such as transceivers, repeaters, couplers, switches, wavelength blocking elements, terminals, and the like) are readily accomplished by those skilled in the art, and thus their details may be omitted. Also, common network communications techniques and network management techniques may be only briefly mentioned or illustrated, their details being well known by skilled artisans. Thus, the steps involved in methods described herein may be readily implemented by those skilled in the art without undue experimentation.

Further, various aspects, features and embodiments of the arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

This disclosure focuses on one embodiment of a composite network that essentially involves overlaying of free space optics (FSO) and WiMAX technologies. However, it is understood that the present disclosure may be applicable to optical technologies other than FSO and to RF technologies other than WiMAX, and even to overlaying technologies other than optical and RF, and to more than two technologies.

FIG. 1 illustrates how radio frequency (RF, for example, WiMAX) and optical (for example, free space optics, FSO) networks may be overlaid to form a composite communications network that communicates with stationary subscribers 150 and mobile subscribers 160. RF transceivers "R" are indicated as squares, and "o"ptical transceivers "O" are indicated as circles. As used in this disclosure, a "cluster" denotes a collection of transceivers that may involve one or more technologies such as FSO and WiMAX. Generally, clusters such as elements 102 and 112 may involve both technologies, but clusters (not illustrated) may also involve only one technology or the other.

Referring to FIG. 1, a first site 100, which may be a building, tower or the like, has a cluster 102 that, for purposes of illustration, happens to contain both RF and FSO transceivers. In one embodiment, the transceivers are connected via optical fiber to a first gigabit (G-) Ethernet network 104, which is in turn connected to a suitable router 108. In another embodiment, a G-Ethernet network is connected to a switch (not specifically illustrated), and the switch is connected to the various transceivers.

Similarly, a second site 110, which may also be a building, tower, or the like, has a cluster 112 of RF and/or FSO transceivers. The transceivers may be connected via optical fiber to a second gigabit Ethernet network 114, which is in turn connected to a suitable router 118. In another embodiment, a G-Ethernet network is connected to a switch (not specifically illustrated), and the switch is connected to the various transceivers.

Sites 100, 110 need not be limited to buildings with clusters on their rooftops. The sites may be towers, base stations, and the like.

Each of routers 108, 118 is connected to one or more servers 130 via a suitable communications medium 120, such as an IP network, which may be the global Internet. The servers execute computer programs that govern operation of a composite network that includes transceivers implemented in plural technologies such as FSO and WiMAX.

In operation, the FSO and RF transceivers communicate with other FSO and RF transceivers, respectively, in other clusters. As illustrated by dashed lines in FIG. 1, an RF transceiver in cluster 102 may communicate with an RF transceiver in cluster 112, and an FSO transceiver in cluster 102 may communicate with an FSO transceiver in cluster 112. Moreover, the transceivers of each technology communicate directly with subscribers (as shown), or (as not shown) indirectly through links with other clusters or through the network 120. Subscribers may be stationary (example: element 150) or mobile (example: element 160).

Figure 2:
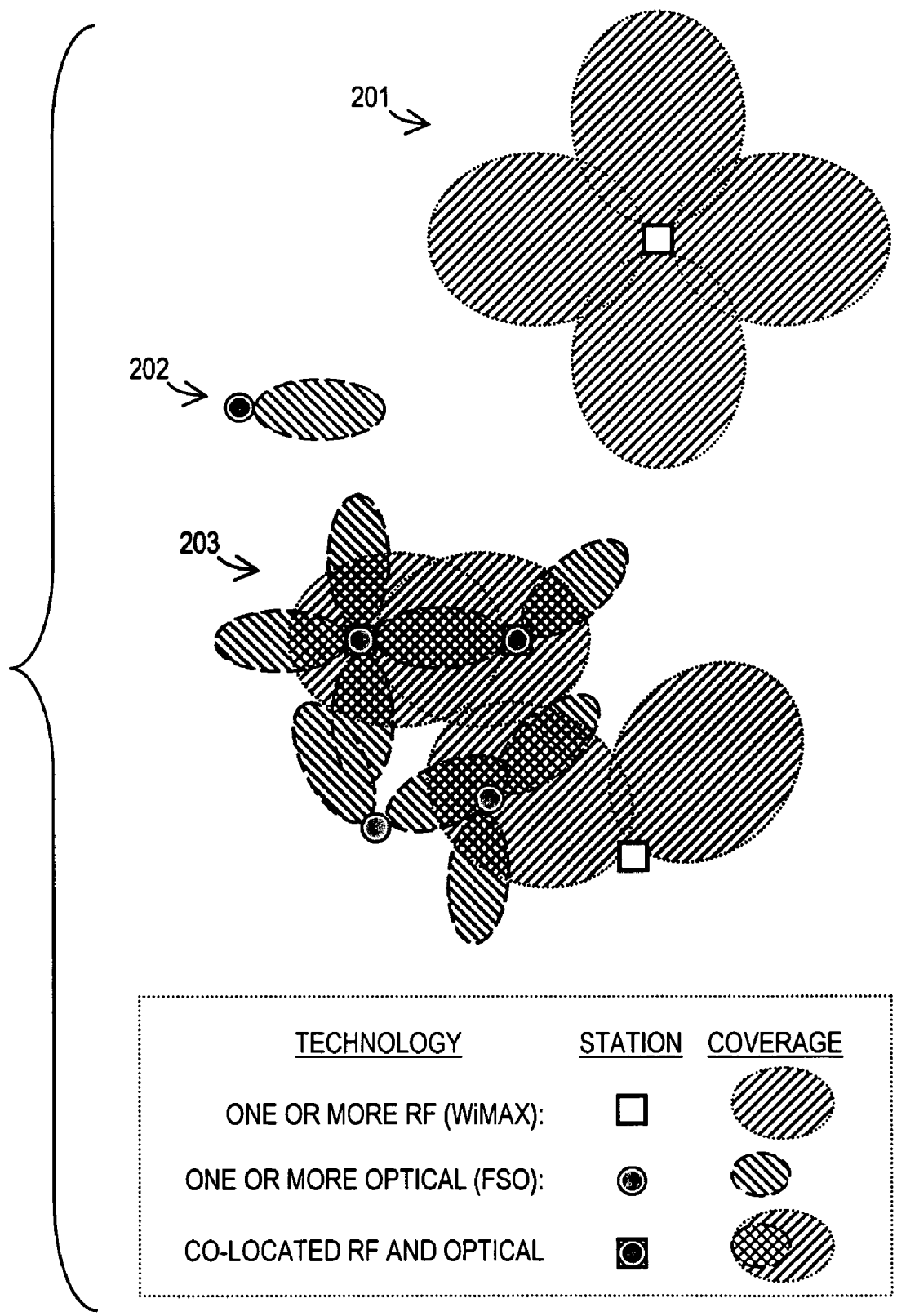
FIG. 2 illustrates how the coverage regions of RF and optical transceivers may overlap.

FIG. 2 illustrates in simplified form, how the coverage regions of RF and optical transceivers may overlap. In FIG. 2, sites with one or more transceivers in a first technology (such as WiMAX) are indicated as squares, and sites with one or more transceivers in a second technology (such as FSO) are indicated as shaded circles. Sites having plural technologies are indicated as squares containing shaded circles.

Transceivers have characteristic coverage regions. In the simplified illustration of FIG. 2, the coverage regions of transceivers are indicated as ovals. Of course, magnetic and atmospheric anomalies, as well as terrain and other obstructions, make actual coverage patterns different from the simplified coverage patterns of FIG. 2.

Generally, RF transceiver coverage regions are larger than FSO coverage regions. Accordingly, RF coverage regions are illustrated as larger ovals with a first direction of hatching, and FSO coverage regions are illustrated as smaller ovals with a second direction of hatching. Areas that are in coverage regions of both RF and FSO are indicated by a cross-hatching that results from overlaying the hatchings of the first and second directions.

Element 201 illustrates a coverage pattern from a site having four RF transceivers, and element 202 illustrates a coverage pattern from a site having a single FSO transceiver. Element 203 illustrates a simplified coverage pattern of a composite RF/FSO network, in which RF and FSO transceivers may be co-located in a given cluster and in which RF and FSO coverage regions overlap.

Applying the simplified model of FIG. 2, when a subscriber is in a region covered by a single technology, only that technology can provide service to him. However, if the subscriber is in coverage regions of more than one technology (overlapping coverage regions), more than one technology can provide service to him, thus providing the subscriber with a choice of transmission speeds, costs of service, and other options. Such options are of special advantage especially when, as in FSO and WiMAX, the strengths of each technology (FSO's transmission speed, WiMAX's range, coverage, robustness and mobility support) can be combined. Moreover, the aggregated coverage regions resulting from a composite coverage region that is greater than the coverage regions of either individual network. Other advantages of providing a composite network include the ability to reduce interference between subscriber connections, the ability to matrix/add high numbers of subscriber connections while meeting FSO to WiMax transmission ratio (see FIG. 8C). Treating FSO channels and WiMAX channels as a single resource, shared among applications, would provide an optimum environment to dynamically respond to application needs.

Figure 3:
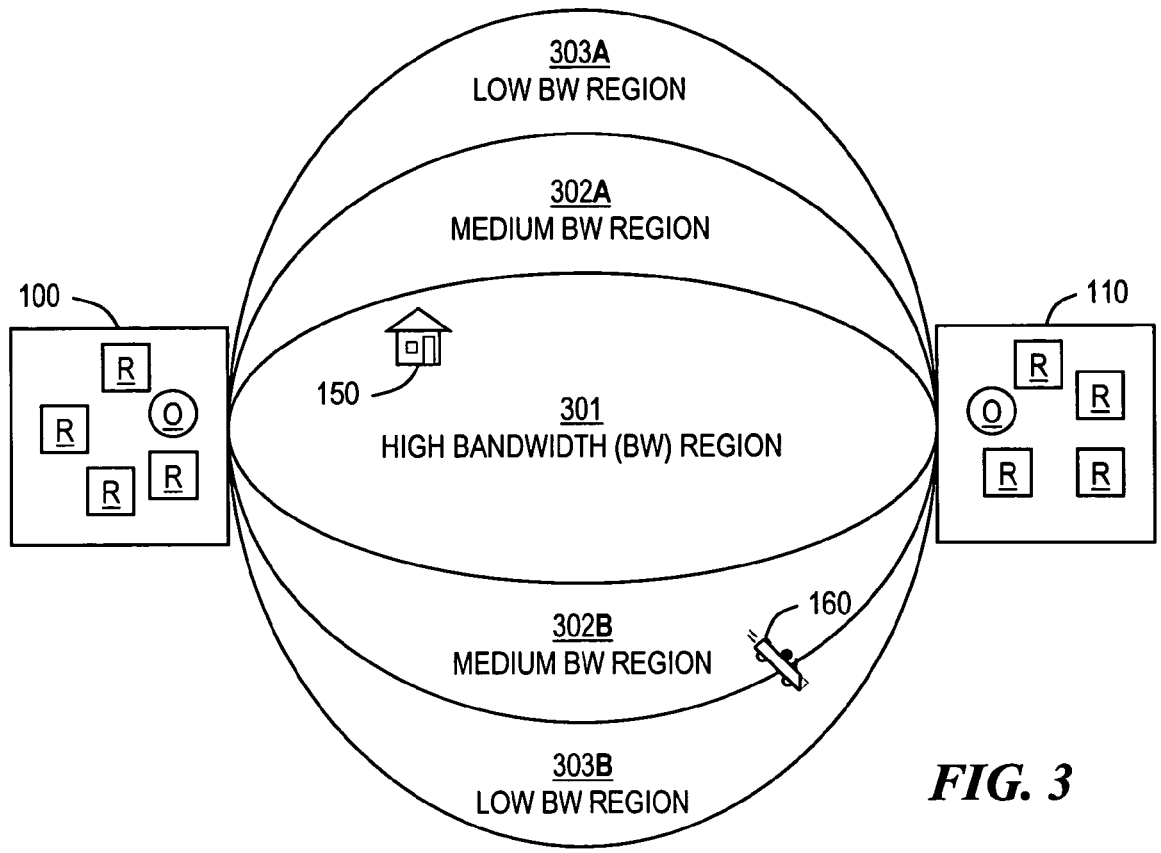
FIG. 3 shows different coverage regions of a composite RF/optical network may be divided into different regions of various respective bandwidths.

Although FIG. 2 ably demonstrates the concept of overlapping coverage areas in a composite FSO/RF network, it does not account for more quantitative effects on transmission bandwidth that are experienced in realistic scenarios. FIG. 3 is less simplified than FIG. 2 in that FIG. 3 shows how RF and FSO coverage regions may interact to provide regions of different bandwidth service availabilities.

Referring to FIG. 3, different coverage regions of a composite RF/optical network may be divided into different regions of various respective transmission bandwidth capabilities. More specifically, FIG. 3's sites 100 and 110 are shown to include respective clusters of four RF ("R") transceivers and one optical ("O") transceiver. A high bandwidth (BW) region 301 is illustrated directly between the two sites. Laterally extending from high bandwidth region 301 are two medium bandwidth regions 302A, 302B. Finally, laterally extending from medium bandwidth regions 302A, 302B are respective low bandwidth regions 303A, 303B. Laterally beyond the low bandwidth regions 303A, 303B are regions that are considered not to provide coverage, even in the composite network.

The location and shape of the high, medium and low bandwidth regions is determined by the transmission characteristics of the various technologies involved (such as FSO and WiMAX), as well as by the number and placement and specific operational characteristics of the particular transceivers involved. Subscribers who are located in the different regions 301, 302, 303 may be provided with services requiring at most their respective bandwidth capabilities (high, medium, low, respectively). Of course, in practical scenarios the shape of the bandwidth regions need not be the concentric ovals of FIG. 3, but are more irregular because of atmospheric aberrations, as well as terrain and other obstructions.

Figure 4:
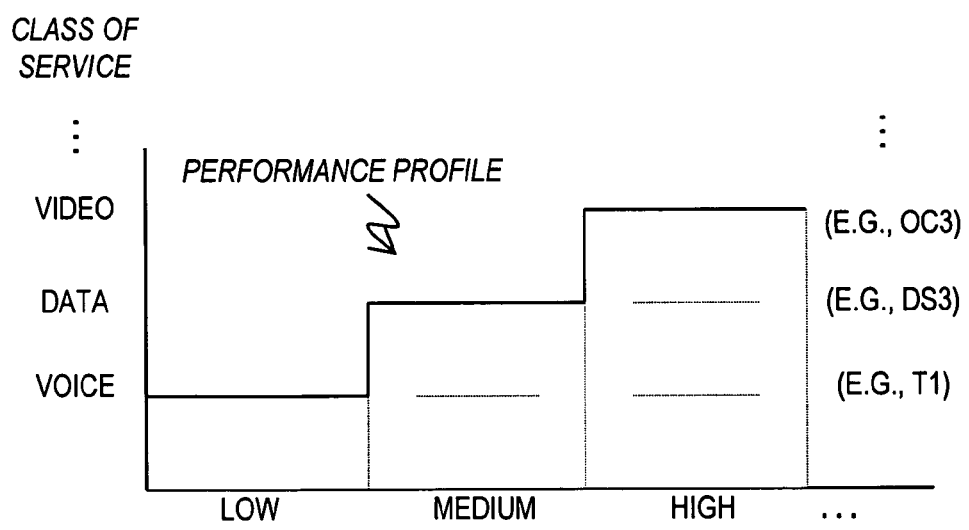
FIG. 4 illustrates part of a simplified performance profile showing various classes of service that are provided when a subscriber is in respective bandwidth regions (see FIG. 3)

FIG. 4 illustrates part of a simplified performance profile showing various classes of service (CoSs) that are provided when a subscriber is in respective bandwidth regions that were explained with reference to FIG. 3. For example a voice (or voice over internet protocol, VoIP) class of service may be provided in all three bandwidth regions, and may operate at T1 speeds (1.544 Mbps). However, the somewhat more demanding data CoS may require at least the transmission speeds (such as DS3, 44.736 Mbps) characteristic of at least the medium bandwidth region. Further, the very demanding video CoS may be supported only in the high bandwidth region 301, as it may require such high transmission speeds as OC3 (155.52 Mbps). The simplified performance profile in FIG. 4 demonstrates that progressively higher-bandwidth regions support CoSs that demand progressively higher data rates. Of course, in practical embodiments, performance profiles may include additional classes that are extrapolated beyond, and interpolated between, the three simplified classes that are shown in FIG. 4.

Referring again to FIG. 3, stationary subscriber 150 is situated in a high bandwidth region 301, and can thus consistently enjoy the highest Class of Service (CoS), which provides all of voice, video and data. However, mobile subscriber 160 is moving from medium bandwidth region 302B to low bandwidth region 303B. In this scenario, mobile subscriber 160 is moving from a region 302B in which he can enjoy voice and data service, into a region 303B that can provide only voice service. According to one embodiment, different levels of service can be dynamically and seamlessly provided to mobile subscribers 160. Moreover, different levels of service can be dynamically and seamlessly provided to stationary subscribers 150 who (for some reason such as atmospheric disturbance) may "slip" from one bandwidth region to another bandwidth region even if they are geographically stationary.

Figure 5:
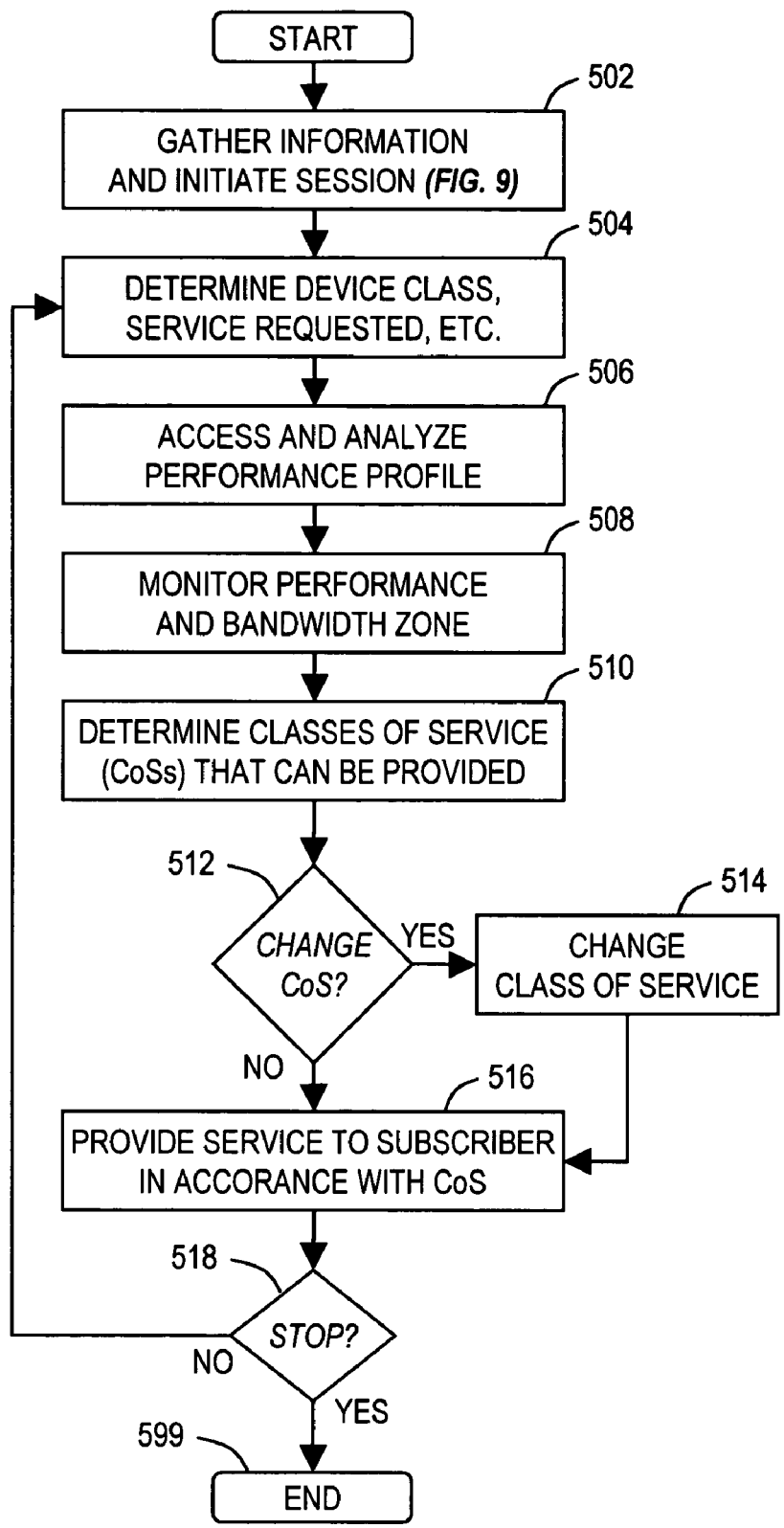
Figure 6:
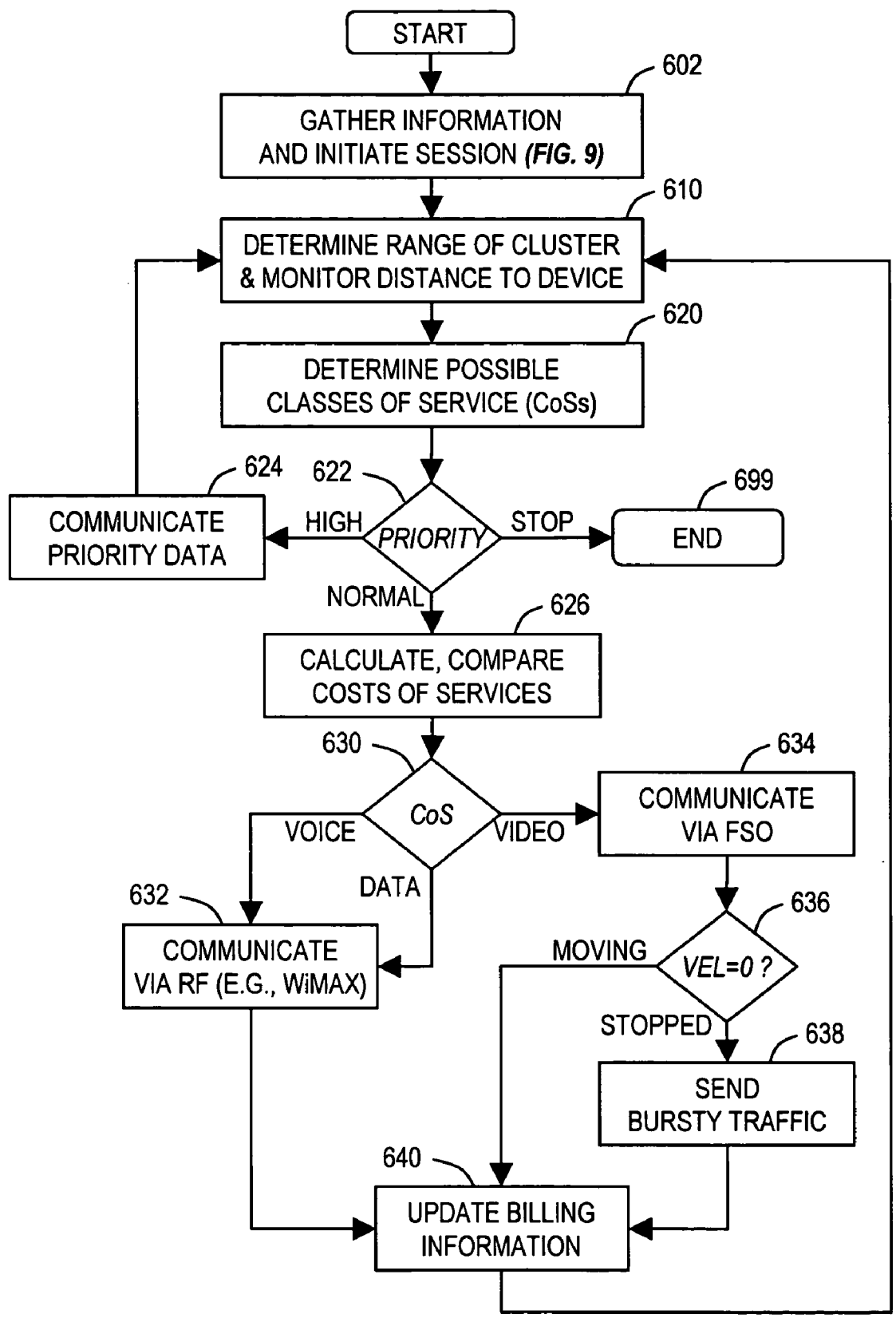
FIG. 6 is a flowchart of one embodiment of a method for providing a least cost wireless communication service based on service availability and class of service.
Figure 7:
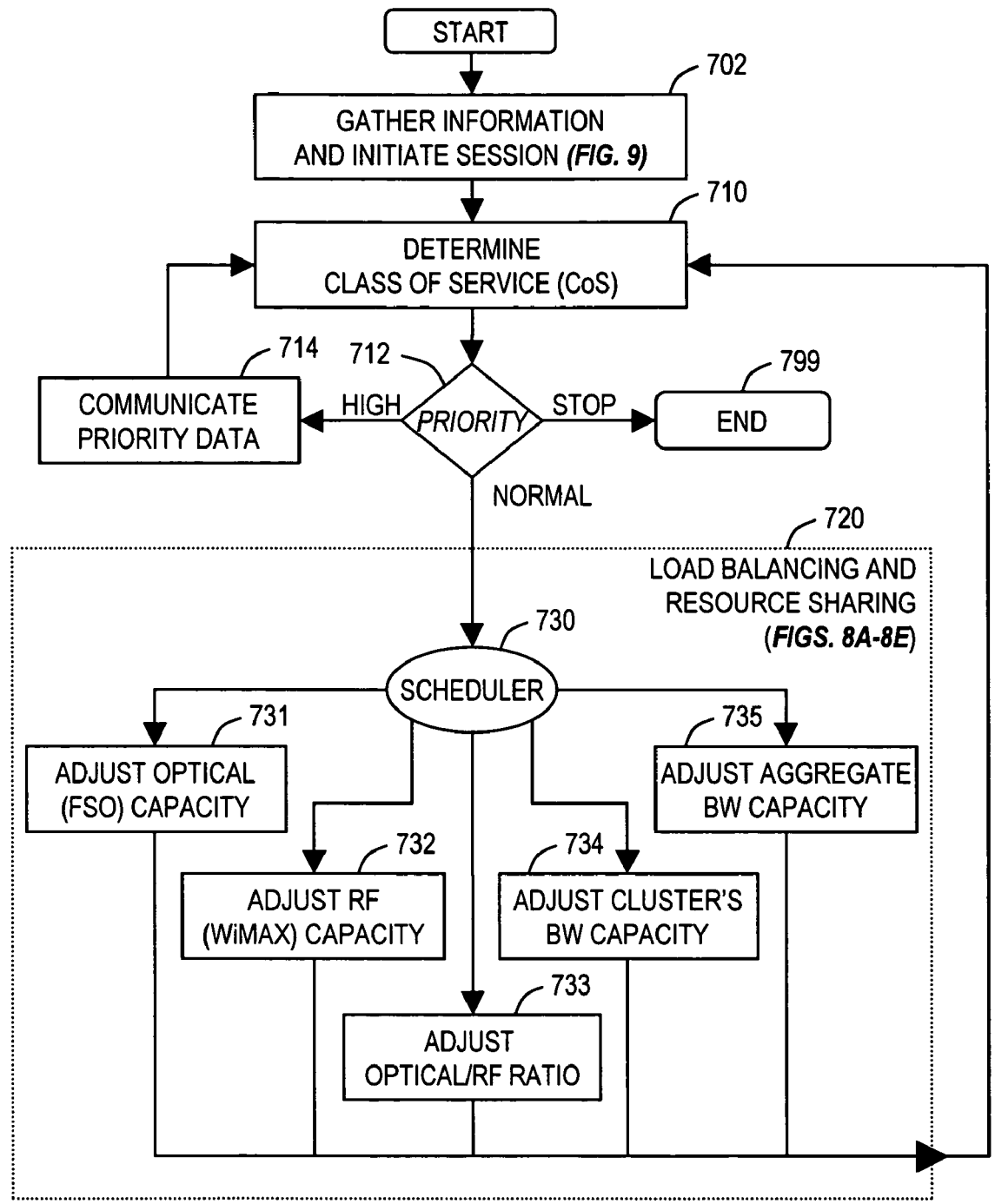
FIG. 7 is a flowchart of one embodiment of a method for load balancing and resource sharing among transceivers and clusters of a composite RF/optical network.

Now, the methods of FIGS. 5, 6, and 7 are described. Although separate descriptions are presented, the methods are not mutually exclusive, and some or all of the method may be executed concurrently in the same system such as one or more servers 130 (FIG. 1). Conversely, the methods are not dependent on each other, and each may be implemented independently of the other methods.

FIG. 5 is a flowchart of one embodiment of a method by which subscribers may be dynamically provided with different classes of service, based at least in part on which bandwidth region (see FIG. 3) the subscriber is in. FIG. 5, like the methods described with reference to FIGS. 6-9, may be performed by one or more general and/or special purpose computer(s) that may constitute server(s) 130 (FIG. 1).

Figure 9:
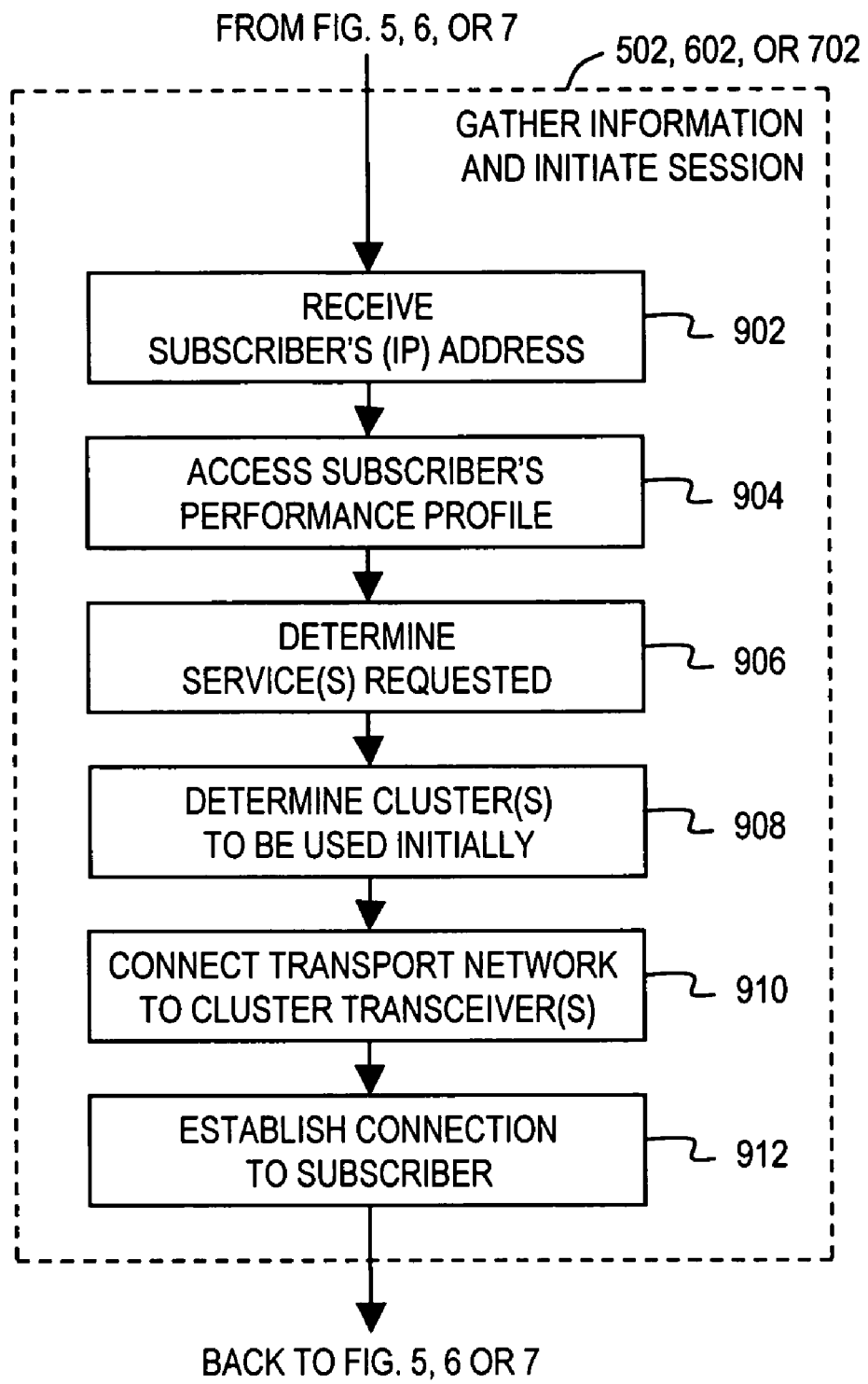
FIG. 9 is a flowchart illustrating one embodiment of a method of gathering information concerning a communication session, and of initiating the session, a method that may be used within the methods shown in FIGS. 5, 6 and 7.

Referring to FIG. 5, block 502 indicates the gathering of information for a communication session with a subscriber such as mobile subscriber 160 (FIG. 3). Briefly, this block indicates the retrieval of needed information concerning the subscriber's identity, and the subscriber's permissions and requests. Block 502 also indicates the initiation of a communication session, such as any required hand-shaking, software connection setup, and the like One embodiment of block 502 is shown in FIG. 9, although it is understood that not all steps in FIG. 9 are included in all embodiments of the methods shown in FIGS. 5-7.

Block 504 indicates the determination of the device class, service requested, and other information. Some of this information may already have been retrieved in block 502, but retrieving it in block 504 (part of an iterative loop) emphasizes that changes in such information may be recognized dynamically (during the course of a single communication session).

Block 506 indicates the accessing and analysis of the performance profile that may be stored in server(s) 130 or in readily accessible location(s). In one embodiment, the performance profile (including a representation of the graph of FIG. 4, for example) is unique to each individual subscriber. This examination of the performance profile may have been performed in block 502 as part of the session setup, but examining it in block 508 emphasizes that changes in the performance profile may be recognized dynamically (during the course of a single communication session).

Block 508 indicates the monitoring of the performance of the communications link with the subscriber, and the determination of which bandwidth zone the subscriber is located in. This may be done by some deterministic method (such as by geographic location determined through global positioning system, GPS) or, more appropriately, according to a test performed once at the beginning of a communication session or repeatedly throughout the session. In particular, monitoring the performance of the communications link may involve comparing an observed bit error rate (BER) with a threshold and/or monitoring a received power level and/or monitoring an observed data transmission rate. Based on one or more monitored features of the link, the server arrives at a judgment of the quality of the link. Based on this judgment, the server judges which bandwidth zone the subscriber is considered to be in.

Block 510 indicates determination the Class of Service (CoS) that is to be provided to the subscriber. This determination may be made based on a variety of factors, such as the class service requested in a particular instance, preferences entered into a subscriber profile on an earlier date, and perhaps most significantly on the link quality monitoring performed in block 508.

Decision block 512 indicates the determination of whether the CoS determined in block 510 is different from the CoS that has been provided to the subscriber in a previous iteration of the FIG. 5 loop. If the CoS should be changed, then control passes to block 514 which indicates the affirmative changing of the CoS provided to the subscriber. Block 514 is understood to encompass the hand-shaking and session alteration that may be needed in order to smoothly effect a changeover from one CoS to another. Furthermore, when changing CoS involves a change from one technology to another (for example, from WiMAX to FSO), control information defining the session may be maintained in both access network technologies so that there are no dropouts when switching technologies or handing off from one transceiver to another.

For example, as subscriber 160 (FIG. 3) moves from medium bandwidth region 302B to low bandwidth region 303B, block 510 should have determined that only a lower CoS (for example, voice service in FIG. 4) can be provided, even though previously a higher Cos (for example, voice+ data in FIG. 4) had recently been provided. If subscriber 160 had been receiving data, he is informed that data transmission service is no longer available and that he is limited to voice speed services; at this time be given the option whether to continue the session. Control then passes from block 514 to block 516.

In contrast, if for example, a subscriber 150 (FIG. 3) has consistently been receiving voice, video and data in a session, and block 510 concludes that the link with the subscriber is well capable of continuing to support a high-bandwidth CoS, then control passes directly from block 512 to block 516, by-passing block 514.

Block 516 generally indicates the provisioning of service to the subscriber. This service must be within the capabilities of the link as determined by block 510, but may be limited by a user's preferences to a lower CoS due to, for example, cost considerations.

Decision block 518 generally indicates a determination of whether or not the communication session should terminate. This determination may be based on a number of factors, such as a subscriber's intentional ending of the session (hanging up), a service provider's determination of a session timeout due to inactivity, and the like. If it is determined that that the session should continue, control returns to block 504 for a next iteration of the loop including blocks 504-518. However, it if is determined that the session should end, control passes to block 599 to terminate the session.

FIG. 6 is a flowchart of one embodiment of a method for providing a "least cost" (or at least, cost-driven) wireless communication service based on service availability and class of service.

Block 602 indicates the gathering of information for a communication session with a subscriber. Briefly, this block indicates the retrieval of needed information concerning the subscriber's identity, as well as the subscriber's permissions and requests. Block 602 also indicates the initiation of a communication session, such as any required hand-shaking, software connection setup, and the like One embodiment of block 602 is shown in FIG. 9, although it is understood that not all steps in FIG. 9 need be included in all embodiments of the methods shown in FIGS. 5-7.

Block 610 indicates the determination of the range of the pertinent cluster of transceivers, as well as the monitoring of the distance of the subscriber to that cluster.

Block 620 indicates the calculation of possible classes of service (CoSs) based on the range and distance determinations of block 610. The classes of service may resemble those in the example of FIG. 4. The possible CoSs for a given subscriber in a given session is based at least in part on the determined or measured speed of communication that is likely to be supported, given the transceiver range and subscriber position of block 610.

Decision block 622 indicates a determination of whether a communication session is to be terminated, or should carry emergency (high priority) traffic, or should carry normal traffic.

If a session is to be terminated (such as by a subscriber "hanging up" or a service provider's closing a session due to detected timeout without activity), then control passes to block 699, which signifies the teardown of the session.

If emergency (high priority) traffic is encountered, control passes to block 624, which indicates the communication of the priority traffic. Emergency traffic may be communications such as "911" or similar calls, police calls, fire department calls, ambulance calls, and the like. Implicit in block 624 is a determination of which technology or technologies (FSO, WiMAX, and so forth) are best employed to quickly and reliably carry the traffic in a particular instance. Thereafter, control passes back to block 610, which indicates the ongoing determination of the range of the pertinent cluster and ongoing monitoring of the distance of the subscriber to the cluster.

If decision block 622 determines that normal traffic is present, then control passes to block 626. Block 626 indicates the calculation and comparison of the relative costs of providing service using different technologies in the present scenario. For example, block 626 may calculate the cost of using FSO for the immediately following time segment, as well as the cost of using RF (WiMAX) for the immediately following time segment. The factors that may enter into the cost calculation include application type, distance from transceiver to subscriber, capacity per transport within that cluster, and so forth.

Thereafter, decision block 630 indicates a determination of which Class of Service (CoS) should be provided to the subscriber. This determination is chosen from among the possible CoSs found in block 620 and the cost comparison performed by block 626. This determination may further be limited by, for example, the subscriber's preferences concerning cost reduction despite the availability of higher-bandwidth services.

In the simplified example of FIG. 6, if block 630 indicates that a low or medium bandwidth (for example, voice class or data class) service should be provided, then control passes to block 632. Block 632 indicates that communication between the cluster and the subscriber occurs via the cluster's RF (WiMAX) transceiver, as routed (for example) by a suitable gigabit Ethernet network 104 (FIG. 1).

However, if block 630 determines that high bandwidth (for example, video class service in FIG. 4) service should be provided, then control passes to block 634. In this event, communication between the cluster and the subscriber occurs via the cluster's FSO transceiver, as routed (for example) by the suitable gigabit Ethernet network 104 (FIG. 1). In the event that FSO is used, decision block 636 indicates a determination of whether the subscriber's velocity with reference to the cluster is essentially zero. If the subscriber is essentially stopped (indicated by a velocity VEL=0), then control passes to block 638 which indicates the transmission of bursty but high data rate communication. Such transmission bursts take advantage of FSO's high data rate capabilities during times when FSO's difficulty in tracking quickly moving targets is immaterial. In contrast, if the subscriber's velocity is non-zero, then block 636 is bypassed to indicate that the extremely high data rate burst transmissions are not carried out at this time.

A change in CoS from one iteration of the FIG. 6 loop may involve a change from one technology to another (for example, from WiMAX to FSO). In this scenario, control information defining the session may be maintained in both access technologies so that there are no dropouts when switching technologies or handing off from one transceiver to another.

In any event, following any of blocks 632, 636, or 638, control passes to block 640. Block 640 indicates the updating of the billing information (and other session tracking information) for the present communication session. The updating is based on which path control has taken to arrive at block 640, as these paths signify the Class of Service (CoS) that has been provided. For example, the path through FSO blocks 634 and 638 (presumably) results in a higher cost increment to the subscriber's account than the voice or data (RF) paths through block 632. The actual amounts incremented to the subscriber's account may depend on the calculation performed in block 626.

Block 640 is included in what is illustrated as an iterative loop beginning with block 610. This inclusion emphasizes that the cost of dynamically changing Classes of Service may be tracked throughout the course a communication session. Of course, simpler cost-monitoring schemes, such as flat-fee or per-session charges, are also envisioned.

In any event, after block 640, control returns to block 610 to begin another iteration of the FIG. 6 loop.

FIG. 7 is a flowchart of one embodiment of a method for load balancing and resource sharing among transceivers and clusters of a composite RF/optical network.

Block 702 indicates the gathering of information for a communication session with a subscriber. Briefly, this block indicates the retrieval of needed information concerning the subscriber's identity, and the subscriber's permissions and requests. Block 702 also indicates the initiation of a communication session, such as any required hand-shaking, software connection setup, and the like One embodiment of block 702 is shown in FIG. 9, although it is understood that not all steps in FIG. 9 need be included in all embodiments of the methods shown in FIGS. 5-7.

Block 710 indicates calculation of a Class of Service (CoS) to be provided to the subscriber. In FIG. 7, this determination may involve choosing from among available CoSs based on technical considerations such as signal strength in a given scenario, subscriber permissions, subscriber preferences concerning cost reduction notwithstanding the availability of higher-bandwidth services, and so forth.

More broadly, block 710 and other blocks in FIG. 7 indicate the concurrent CoS calculation for many subscribers that are in a given area and thus collectively affect bandwidth usage of transceivers serving that area. Certain portions of the present description may focus on a single subscriber and a single communication session, but that is merely to simplify the description.

Decision block 712 indicates a determination of whether a given communication session is to be terminated, or should carry emergency (high priority) traffic, or should carry normal traffic.

If a session is to be terminated (such as by a subscriber "hanging up" or a service provider's closing a session due to detected timeout without activity), then control passes to block 799, which signifies the teardown of the session.

If emergency (high priority) traffic is encountered, control passes to block 714, which indicates the communication of the priority traffic. Emergency traffic may be communications such as "911" or similar calls, police calls, fire department calls, ambulance calls, and the like. Implicit in block 714 is a determination of which technology or technologies (FSO, WiMAX, and so forth) are best employed to quickly and reliably carry the traffic in a particular instance. Thereafter, control passes back to block 710, which indicates the ongoing calculation of the CoS to be provided to the subscriber.

Figure 8A:
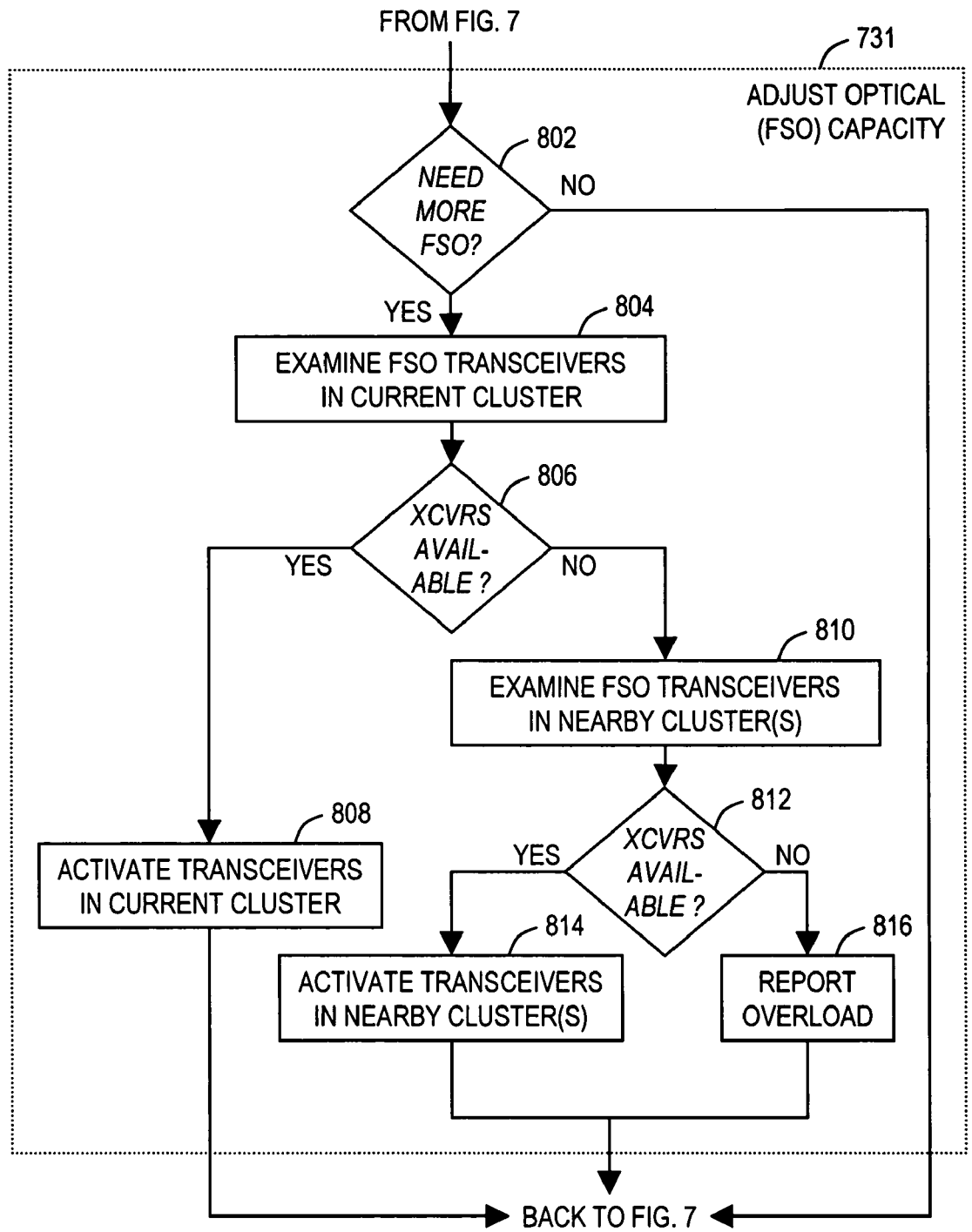
FIGS. 8A through 8E (collectively referred to herein as "FIG. 8") illustrate respective embodiments of corresponding blocks in FIG. 7.

If decision block 622 determines that normal traffic is present, then control passes to block 720, which generally indicates the various load balancing and resource sharing capabilities of the present arrangement. Included in block 720 is a scheduler 730 for governing the sequence in which various functions may be carried out, the functions being represented by a set of blocks 731, 732, 733, 734, 735:

Block 731 indicates the adjustment of capacity (usage of bandwidth) when optical (for example, FSO) transceivers are employed. One embodiment of block 731 is shown in FIG. 8A.

Figure 8B:
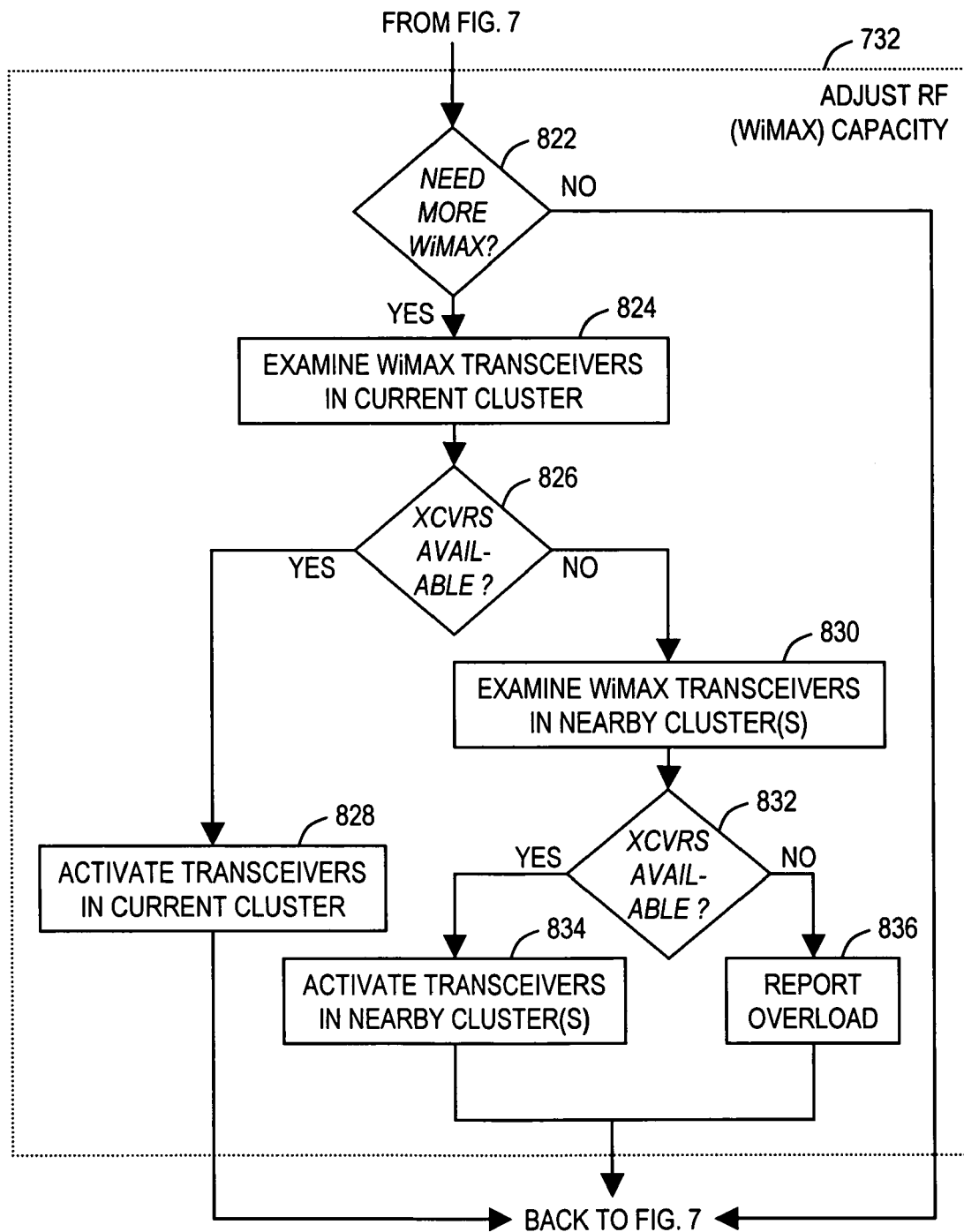

Block 732 indicates the adjustment of capacity (usage of bandwidth) when RF (for example, WiMAX) transceivers are employed. One embodiment of block 732 is shown in FIG. 8B.

Figure 8C:
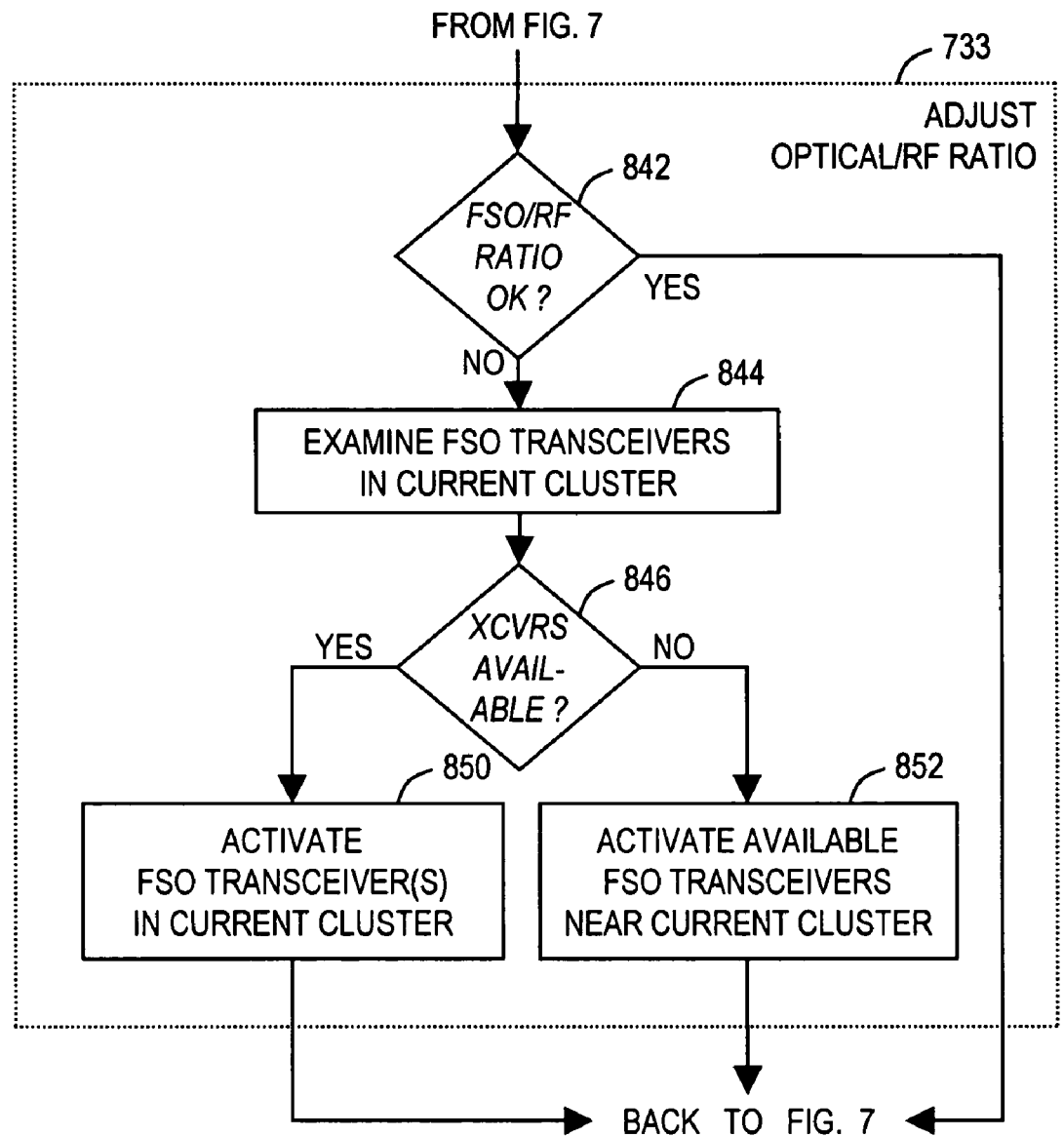

Block 733 indicates the adjustment of a ratio of optical (for example, FSO) transceiver bandwidth used to RF (for example, WiMAX) transceiver bandwidth used, in cluster(s) employing multiple technologies. One embodiment of block 733 is shown in FIG. 8C.

Figure 8D:
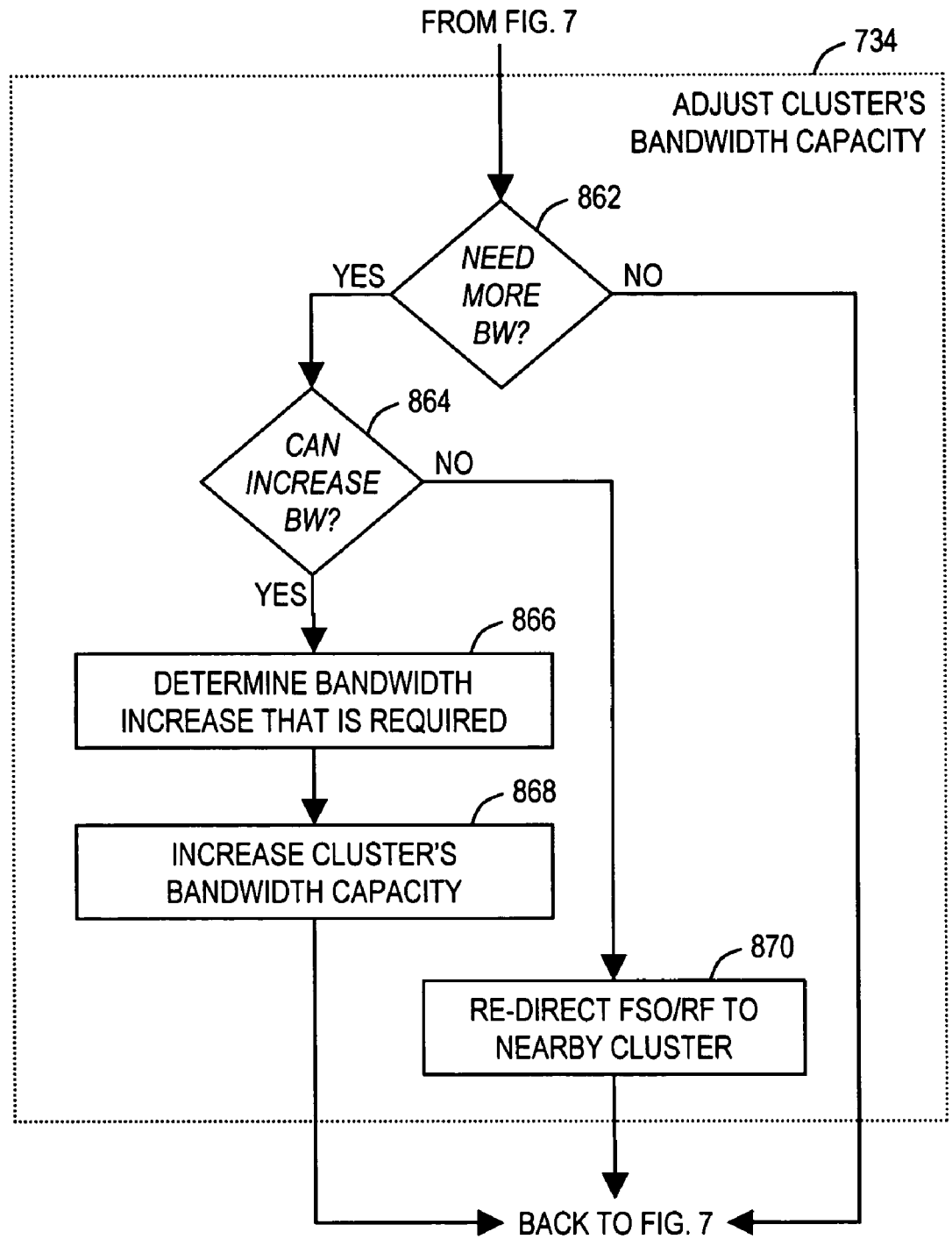

Block 734 indicates adjustment of a cluster's capacity (usage of bandwidth), with the understanding that the cluster may operate more than one technology (FSO and/or WiMAX), as distinguished from blocks 731 and 732 which focus on respective individual technologies. One embodiment of block 734 is shown in FIG. 8D.

Figure 8E:
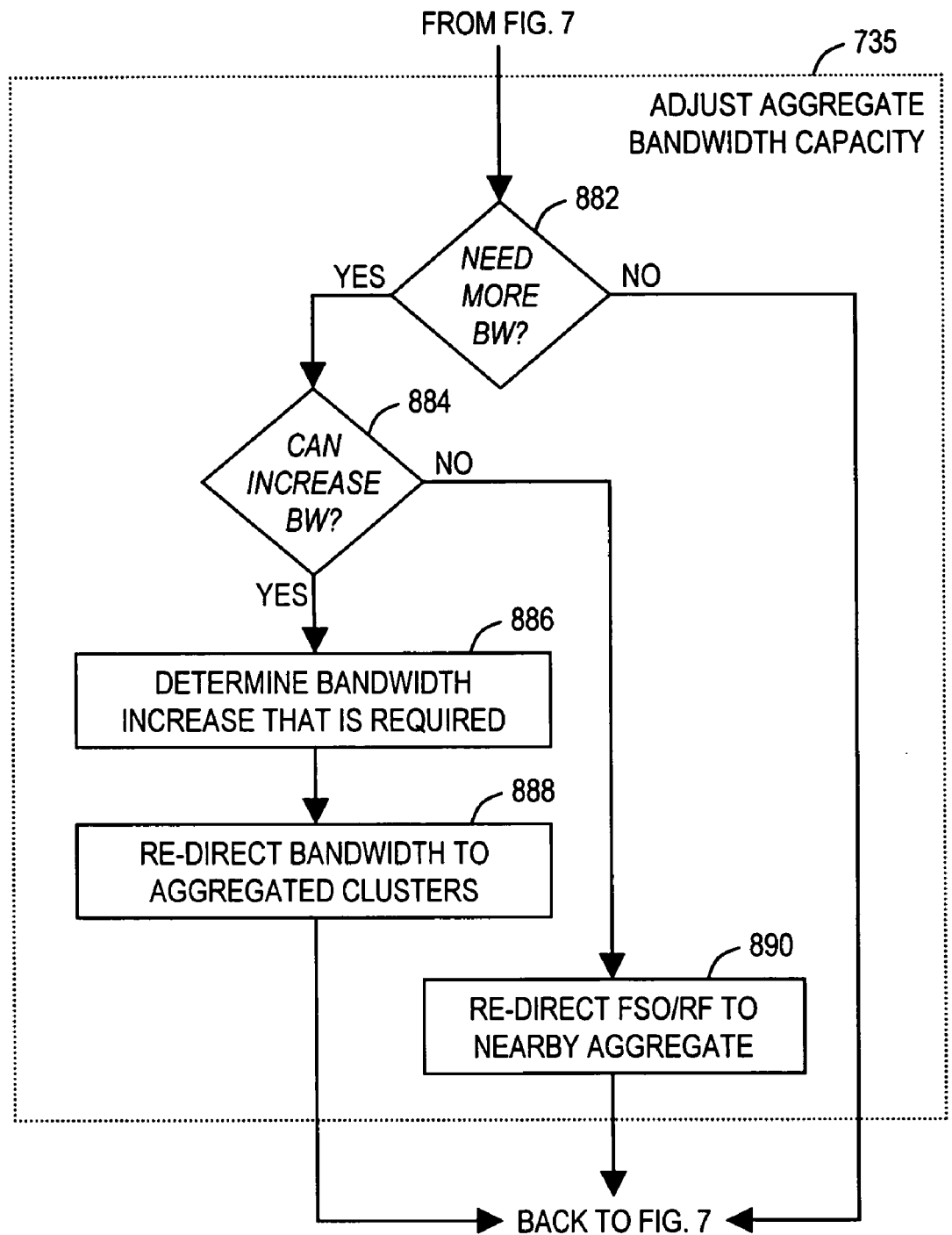

Block 735 indicates adjustment of the capacity (usage of bandwidth) among an aggregate of plural clusters, with the understanding that each cluster may operate more than one technology (FSO and/or WiMAX), as distinguished from blocks 731 and 732 which focus on respective individual technologies. One embodiment of block 735 is shown in FIG. 8E.

Other load balancing and resource sharing functions, though not specifically illustrated, lie within the contemplation of the invention.

Scheduler 730 determines how often, and in what order, the various functions of blocks 731-735 are performed. A simple embodiment of scheduler involves a sequential execution of each block. Another embodiment permits concurrent execution of plural blocks. Still another embodiment ensures that related blocks are performed in a desired order.

In any event, the pathways leading from each of blocks 731-735 back to block 710 emphasize that the load balancing and resource sharing function(s) are part of an ongoing process (shown as an iterative loop) in which classes of service provided to subscribers may be dynamically modified. The load balancing and resource sharing functions performed in block 720 adapt to changes in not only the number of subscribers entering and leaving a service scenario, but also adapt to changes in the classes of service being provided to particular subscribers.

FIGS. 8A through 8E (collectively referred to herein as "FIG. 8") illustrate respective embodiments of blocks 731-735 in FIG. 7.

Referring to FIG. 8A which is a flowchart of one embodiment of block 731 from FIG. 7, block 802 indicates a determination of whether additional optical (for example, FSO) capacity is needed in a given cluster. If no more capacity is needed, control exits block 731. However, if more capacity is needed, control passes to block 804.

Block 804 indicates examination of the FSO transceivers in the current cluster to determine whether all physically available transceivers are active, and the degree to which the active transceivers are being used.

Decision block 806 depicts a determination of whether there is available capacity (usable bandwidth) in the FSO transceivers of the current cluster. This availability may manifest as transceivers that are not active (not being used at all), as well as transceivers that are active but whose bandwidth capabilities are not being fully utilized If there is bandwidth available in the current cluster, then control passes to block 808 which indicates the activation of transceivers in the current cluster. Implicit in block 808 is the increased usage of transceivers that were previously underutilized.

However, if there is no bandwidth available in the current cluster, control passes to block 810. Block 810 indicates the examination of a nearby cluster (or plural nearby clusters). This examination is essentially the same as that described with reference to block 804.

Decision block 812 determines whether or not there is bandwidth available in the nearby cluster(s). Bloc 812's determination may be carried out in a manner analogous to block 806, except that the subject of the examination is the nearby cluster(s) and not the original cluster. If bandwidth is available in the nearby cluster(s), then control passes to block 814 for activation of transceivers in the nearby cluster(s). However, if bandwidth is not available in the nearby cluster (s), then a network overload condition is reported to a network management entity, as indicated at block 816.

After each of blocks 808, 814, and 816, control returns to FIG. 7 for ongoing load balancing and resource sharing.

FIG. 8B which is a flowchart of one embodiment of block 732 (FIG. 7). The logical flow of FIG. 8B is analogous to that of FIG. 8A, except that FIG. 8B involves transceivers employing radio frequency (for example, WiMAX) technology instead of transceivers employing optical (for example, FSO) technology as in FIG. 8A. Elements of FIG. 8B are numbered 20 higher than corresponding elements of FIG. 8A, but otherwise the descriptions of the two methods are the same. Accordingly, a separate description of FIG. 8B is unnecessary, and is omitted.

Referring to FIG. 8C which is a flowchart of one embodiment of block 733 from FIG. 7, block 842 indicates a determination of whether the ratio of FSO to RF transceivers is acceptable in a current scenario. This determination is important for ensuring that RF traffic does not interfere with other RF traffic. As greater numbers of subscribers enter a coverage region and presumably use the more economical RF communications, inter-channel interference tends to increase. As such interference increases, the value of using FSO increases because the low level of interference characterizing optical communications. Therefore, a likely factor in block 842's determination of whether the ratio of FSO to RF transceivers is acceptable, is the number of subscribers in the coverage region of the cluster or cluster aggregation. Alternatively, the actual level of interference being experienced may be measured empirically, and the decision made according to that measurement.

If block 842 finds the FSO/RF ratio to be unacceptable, control passes to block 844 (described below).

If the ratio is found to be acceptable, control passes back to FIG. 7 for continued load balancing and resource sharing. One embodiment recognizes that if the FSO/RF ratio is found acceptable, it is advisable to then verify overall bandwidth capacity for the cluster is acceptable, a function that is performed by block 734 (FIGS. 7 and 8D). In this embodiment, scheduler 730 (FIG. 7) ensures that block 734 (FIG. 8D) is performed after block 733 (FIG. 8C).

Block 844 indicates the examination of the FSO transceivers in the current cluster (or current aggregation of clusters) to determine whether all physically available transceivers are active, and the degree to which the active transceivers are being used.

Decision block 846 depicts a determination of whether there is available capacity (usable bandwidth) in the FSO transceivers of the current cluster (or cluster aggregation). This availability may manifest as transceivers that are not active (not being used at all), as well as transceivers that are active but whose bandwidth capabilities are not being fully used.

If bandwidth capacity is available in the current cluster (or cluster aggregation), then control passes to block 850 which indicates activation of FSO transceivers in the current cluster (or cluster aggregation). However, if bandwidth capacity is not available in the current cluster (or cluster aggregation), then control passes to block 852 which indicates activation of FSO transceivers that are available in nearby clusters (or nearby cluster aggregations). Block 852 implicitly includes a determination of whether given clusters have available FSO bandwidth, and routing of traffic to available transceivers. In either event (after block 850 or after block 852), control returns to FIG. 7 for ongoing load balancing and resource sharing.

Referring to FIG. 8D which is a flowchart of one embodiment of block 734 from FIG. 7, block 862 indicates a determination of whether more bandwidth is needed for a current cluster, considering more than one technology (such as FSO and WiMAX). Such a need may arise, for example, from an increased number of subscribers requesting service, or a net increase in the Class of Service (CoS, FIG. 4) collectively requested by active subscribers.

If there is no need for more bandwidth, then control passes back to FIG. 7 for ongoing load balancing and resource sharing.

However, if more bandwidth is needed, control passes to decision block 864 which indicates a determination of whether it is possible for the current cluster to increase the bandwidth it provides. Block 864 implicitly includes an examination of the usage of active transceivers, and an inquiry into how much of the bandwidth of active transceivers is being currently utilized.

If block 864 determines that the current cluster cannot provide increased bandwidth, then control passes to block 870 which indicates redirection of traffic to a nearby cluster. Implicit in block 870 is a determination of whether that nearby cluster can increase the bandwidth it provides, in much the same manner that block 864 has done for the current cluster. In this manner, a request for increase bandwidth can ripple through to a cluster that can support the request.

In contrast, if block 864 determines that the current cluster can provide increased bandwidth, then control passes to block 866.

Block 866 indicates a calculation of the quantity of bandwidth increase that is required. Such a determination may be made from examining the criteria used in block 862 to determine the bandwidth need in the first place.

After block 864 determines the bandwidth quantity needed, block 868 increases the current cluster's bandwidth capacity. This increase may be achieved through activation of transceivers of one or more technologies that were not previously active. Alternatively, this increase maybe achieved through more complete use of transceivers that had been underutilized.

After either block 868 or 870, FIG. 8 indicates that control returns to FIG. 7 for ongoing load balancing and resource sharing.

Referring to FIG. 8E which is a flowchart of one embodiment of block 735 from FIG. 7. The logic of FIG. 8E is analogous to that of FIG. 8D, described above, except that instead of considering FIG. 8D's current cluster and nearby clusters, FIG. 8E considers a current aggregate of clusters and nearby aggregates of clusters. Each function indicated in FIG. 8E corresponds to a block in FIG. 8D that bears a reference numeral that is 20 smaller, but the essential description is the same. Accordingly, a description specifically directed to FIG. 8E is omitted since it is essentially repetitive and therefore unnecessary.

FIG. 9 is a flowchart illustrating one embodiment of a method of gathering information concerning a communication session, and of initiating the session, a method that may be used within the methods shown in FIGS. 5, 6 and 7.

Block 902 indicates the reception of the subscriber's unique address in the communication network. This reception can be FIG. 1 server 130's inputting of the address from a data store in response to a call (or other session) placed by or to the subscriber. In one embodiment, this address is the subscriber's device's internet protocol (IP) address. This portion of the process may be considered to be part of device discovery, in which various technologies (FSO, WiMAX, fiber) may be employed in concert to uniquely identify and locate a subscriber.

Block 904 indicates the server's accessing of the subscriber's performance profile. Part of a subscriber's performance profile may resemble that shown in FIG. 4, which shows a maximum Class of Service (CoS) that can be provided for a given bandwidth region (FIG. 3) in which the subscriber is located. Other data that can be considered to be part of the subscriber's performance profile includes any restrictions that are placed on the subscriber's account, such as spending limits per unit time, and so forth. Moreover, a set of preferences of the subscriber, such as a pre-chosen instruction to use a lower-cost CoS even when a higher-speed CoS is available in a given scenario, may be included in the subscriber's performance profile.

In one embodiment, the performance profile also includes specific designations for particular types of service, such as store-wait-forward services. Other services may include voice only, voice and data only, video only, video and voice and data, always forward, store for later review, download for later review, compression, download to specific devices, download to all devices, various choices for uploading, and so forth. The performance profile may house various application navigation capabilities allowing such dynamic custom choices selections for voice, video and data.

The performance profile may also be used as a billing component, to track subscriber billing and usage by based on assembled subscriber choices and preferences. More generally, the performance profile supports internal processes as well as subscriber requirements, and may be dynamically updated.

Block 906 indicates a determination of the services that are requested, either by the subscriber (if he initiates the call of other communication session) or by the entity that "calls" the subscriber (or initiates another type of communication session with the subscriber). Such requested services may be, for example, voice, video or data services. Requested services are distinguished from services that are technologically available in a given scenario during operation.

Block 908 indicates the determination of which cluster of transceivers that is to be used to communicate with the subscriber, at least initially. This determination is made by any suitable method, such as the cluster with the greatest measured signal strength or the cluster that is closest to the subscriber's geographic location. The determination may also be affected by the class of service requested, so that (for example) a cluster with at least one FSO transceiver is selected when a high-bandwidth (for example, video) service is requested.

Block 910 indicates the connection of the communication system's transport network to the transceiver(s) of the cluster selected in block 908. Essentially, this completes the connection between calling party and called party through the network and any intervening routers, local networks, switches and fibers. In the context of block 910, this "connection" is essentially physically and is concerned with hardware.

Block 912 indicates the formal establishment of a higher-level communication connection with the subscriber. In the context of block 912, this connection is essentially a "software" connection. This "software" connection, which may be termed a session, is enabled by the "hardware" connection of block 910. After this point, payload traffic may be communicated to and from the subscriber.

With the establishment of the communication session, control returns to the appropriate method under consideration, such as those shown in FIGS. 5, 6 and 7. Of course, it is understood that not all of the functions performed in FIG. 9 need to be executed in any given embodiment, nor need they necessarily be performed in the order described. Additionally, steps other than those shown and described may be performed to satisfy the requirements of any particular implementation.

The disclosed methods may be executed by any appropriate general and/or special purpose processors and/or computer systems employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

An integrated FSO and WiMAX physical interface may be complemented with multiprotocol label switching (MPLS) technology to optimize mapping of various traffic types with MPLS tags at the edge closest to end devices. MPLS, supported by Multiple Layer Switching, can provide support for quality of service (QoS) capability. Matching layers provides a seamless transition of QoS within the FSO/WiMax transport capabilities to the end user. MPLS distinguishes the paths, and QoS is the quality of that path the application takes.

Ethernet passive optical network (EPON) data packets may be tagged with MPLS for optimal distribution over WiMAX radios. Dedicated well known tags may be identified for telephony, ISDN, HDTV video, Interactive Video, Internet access, video conference, multicast and residential versus business services. A standard treatment of each tag with optimum medium access control (MAC) layer configuration at WIMAX may be provided.

End devices and access devices seamlessly enable higher layer application and controls based on well known MAC-layer controls based on MPLS tags received by each device. Optimal switching may be performed at end devices and edge devices seamlessly with best QoS achievements.

A table look up engine based on this standard may be loaded at every device and access point. Fiber may be brought close to the end device, and point to multipoint broadcast may be used for last mile distribution at hardware speed, therefore reducing jitter and delay, and achieving better application QoS.

As an additional feature, satellite communications may be integrated with WiMAX, Cable WiMAX and other technologies. In one arrangement, content providers may broadcast or bring content to the edge, where WiMAX and FSO may be used to distribute a stream to end devices. Content providers can bring tens of thousands of channels to the neighborhood (edge of the network) and end users select different channels via long range remote controls over WiMAX. This arrangement distinguishes from conventional arrangements in which TV channels are switched because cable continuously brings a much smaller number of channels (hundreds) all the way to the home.

From the foregoing, it will be apparent to those skilled in the art that a variety of methods, systems, computer programs on recording media, and the like, are provided.

The foregoing description provides support for a method (FIG. 5) for use an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways, a method of providing Classes of Service (CoS) to a subscriber located among plural regions (301, 302, 303) that are defined by plural respective transmission bandwidth capabilities. The method may involve (508) monitoring which region (301, 302, or 303) the subscriber is located in; (510) determining at least one possible CoS that can be provided to the subscriber using at least one of the FSO and RF networks, based on a transmission bandwidth capability of the region in which the subscriber is located; and (516) providing a CoS to the subscriber from among the possible CoSs determined in the determining step.

The method may also involve (508) determining that the subscriber has changed location from a first region into a second region; (512) determining that a second CoS associated with the second region is different from a first CoS associated with the first region; and (514) changing the CoS provided to the subscriber from the first CoS to the second CoS.

The CoS changing step (514) may involve changing communication with the subscriber from FSO to RF within a single communication session.

The CoS changing step (514) may involve changing communication with the subscriber from RF to FSO within a single communication session.

The CoS determining step (510) may involve referring to a performance profile (FIG. 4) associated with the subscriber; and providing the CoS to the subscriber based on a consideration of both (1) the performance profile and (2) the transmission bandwidth capability of the region in which the subscriber is located.

The RF network may be a WiMAX network.

The present disclosure further provides support for a method (FIG. 6) for use in an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways, a method of providing a communication service to a subscriber. The method may involve (620) ascertaining plural possible Classes of Service (CoSs) that can be provided to the subscriber using at least one of the FSO and RF networks; (626) comparing respective projected costs of the plural possible CoSs; and (630) selecting a CoS to provide to the subscriber from among the plural possible CoSs, based at least in part on the comparison of the respective projected costs of the plural possible CoSs.

The method may further comprise (610) determining a location of the subscriber in relation to at least one of the FSO and RF networks; and the ascertaining step (620) may include ascertaining the plural possible Classes of Service (CoSs) based at least in part on the subscriber's determined location.

The location determining step (610) may include considering a range of a cluster of transceivers in at least one of the FSO and RF networks; and monitoring a distance of the subscriber to the cluster of transceivers.

The method may also involve (632) providing a CoS involving the RF network if the selecting step (630) includes selecting a CoS requiring voice transmission.

The method may further involve (632) providing a CoS involving the RF network if the selecting step (630) includes selecting a CoS requiring data transmission.

The method may also involve (634) providing a CoS involving the FSO network if the selecting step (630) includes selecting a CoS requiring video transmission.

The method may also involve (632) providing a CoS involving the RF network if the selecting step (630) includes selecting a CoS requiring voice transmission; (632) providing a CoS involving the RF network if the selecting step (630) includes selecting a CoS requiring data transmission; and (634) providing a CoS involving the FSO network if the selecting step (630) includes selecting a CoS requiring video transmission.

The method may further involve (638) communicating high data rate bursts using the FSO network when subscriber has a velocity of zero in relation to a transceiver of the FSO network.

The RF network may be a WiMAX network.

The selecting step (630) may involve selecting a CoS to provide to the subscriber from among the plural possible CoSs, based at least in part on a previously stored subscriber preference instructing that a less costly CoS should be provided despite availability of a higher bandwidth CoS among the plural possible CoSs ascertained in the ascertaining step (620).

The present disclosure also provides support for a load balancing and resource sharing method (FIG. 7) for use in an integrated communications network that includes a free space optics (FSO) network configured to transmit optical signals over line of sight (LoS) pathways and a wireless radio frequency (RF) network configured to transmit RF signals over RF pathways including non-line-of-sight (NLoS) pathways. The load balancing and resource sharing method may involve (802, 822, 842, 862, 882) determining whether or not to provide additional bandwidth capacity in, or to re allocate bandwidth capacity among, transceivers in the FSO and RF networks, in clusters of the transceivers, or in aggregates of the clusters of the transceivers; and (FIGS. 8A-8E) providing the additional bandwidth capacity or re allocating the bandwidth capacity determined in the determining step.

The determining step may involve determining (802) whether or not additional FSO bandwidth capacity is required in a given cluster including FSO transceivers; and the providing step may include (808) activating FSO transceiver capacity in the given cluster.

The determining step may include (802) determining whether or not additional FSO bandwidth capacity is required in a given cluster including FSO transceivers; the method may further involve ascertaining (806) whether or not additional FSO bandwidth capacity is present in the given cluster; and the providing step may include (808) activating FSO transceiver capacity in the given cluster if the additional FSO capacity is present in the given cluster, but (814) activating FSO transceiver capacity in a nearby cluster if the additional FSO capacity is not present in the given cluster.

The determining step may include determining (822) whether or not additional RF bandwidth capacity is required in a given cluster including RF transceivers; and the providing step may include (828) activating RF transceiver capacity in the given cluster.

The determining step may include (822) determining whether or not additional RF bandwidth capacity is required in a given cluster including RF transceivers; the method may further comprise ascertaining (826) whether or not additional RF bandwidth capacity is present in the given cluster; and the providing step may include (828) activating RF transceiver capacity in the given cluster if the additional RF capacity is present in the given cluster, but (834) activating RF transceiver capacity in a nearby cluster if the additional RF capacity is not present in the given cluster.

The determining step may include (842) determining whether or not a ratio of FSO transceivers to RF transceivers in a given cluster fulfills a standard of reducing RF interference in communications in the RF network; and (850) activating FSO transceiver capacity in the given cluster.

The determining step may include (842) determining whether or not a ratio of FSO transceivers to RF transceivers in a given cluster fulfills a standard of reducing RF interference in communications in the RF network; the method may further comprise ascertaining (846) whether or not additional FSO bandwidth capacity is present in the given cluster; and the providing step may include (850) activating FSO transceiver capacity in the given cluster if the additional FSO capacity is present in the given cluster, but (852) activating FSO transceiver capacity in a nearby cluster if the additional FSO capacity is not present in the given cluster.

The determining step may include determining (862) whether or not additional bandwidth capacity is required in a given cluster including transceivers; and the providing step may include (868) activating transceiver capacity in the given cluster.

The determining step may include (862) determining whether or not additional bandwidth capacity is required in a given cluster including transceivers; the method may further comprise ascertaining (864) whether or not additional bandwidth capacity is present in the given cluster; and the providing step may include (868) activating transceiver capacity in the given cluster if the additional capacity is present in the given cluster, but (870) activating transceiver capacity in a nearby cluster if the additional capacity is not present in the given cluster.

The determining step may include determining (882) whether or not additional bandwidth capacity is required in a given cluster aggregation including transceivers; and the providing step may include (888) activating transceiver capacity in the given cluster aggregation.

The determining step may include (882) determining whether or not additional bandwidth capacity is required in a given cluster aggregation including transceivers; the method may further comprise ascertaining (884) whether or not additional bandwidth capacity is present in the given cluster aggregation; and the providing step may include (888) activating transceiver capacity in the given cluster aggregation if the additional capacity is present in the given cluster aggregation, but (890) activating transceiver capacity in a nearby cluster aggregation if the additional capacity is not present in the given cluster aggregation.

The present disclosure further provides support for computer program products including computer executable code or computer executable instructions that, when executed, causes a computer to perform the methods described herein.

The foregoing description further supports systems configured to perform the methods described above.

Many alternatives, modifications, and variations will be apparent to those skilled in the art in light of the above teachings. For example, the number and relative location and interconnection of elements may be varied while remaining within the scope of the present invention. Likewise, the steps involved in methods described herein may be implemented in a manner different than as described above. It is therefore to be understood that within the scope of the appended claims and their equivalents, the invention may be practiced otherwise than as specifically described herein.

What is claimed is:

1. In an integrated communications network that includes a free space optics (FSO) network configured to transmit optical signals over line-of-sight (LoS) pathways and a wireless radio frequency (RF) network configured to transmit RF signals over RF pathways including non-line-of-sight (NLoS) pathways, a method of providing Classes of Service (CoS) to a subscriber located among plural regions that are defined by plural respective transmission bandwidth capabilities, the method comprising:
monitoring which region the subscriber is located in;
determining at least one possible CoS that can be provided to the subscriber using at least one of the FSO and RF networks, based on a transmission bandwidth capability of the region in which the subscriber is located; and
providing a CoS to the subscriber from among the possible CoSs determined in the determining step.

2. The method of claim 1, further comprising:
determining that the subscriber has changed location from a first region into a second region;
determining that a second CoS associated with the second region is different from a first CoS associated with the first region; and
changing the CoS provided to the subscriber from the first CoS to the second CoS.

3. The method of claim 2, wherein the CoS changing step includes:
changing communication with the subscriber from FSO to RF within a single communication session.

4. The method of claim 2, wherein the CoS changing step includes:
changing communication with the subscriber from RF to FSO within a single communication session.

5. The method of claim 1, wherein the CoS determining step includes:
referring to a performance profile associated with the subscriber; and
providing the CoS to the subscriber based on a consideration of both (1) the performance profile and (2) the transmission bandwidth capability of the region in which the subscriber is located.

6. The method of claim 1, wherein:
the RF network is a WiMAX network.

7. A computer readable medium encoded with computer executable code or computer executable instructions that, when executed, causes a computer to perform the method of claim 1.

8. In an integrated communications network that includes a free space optics (FSO) network configured to transmit optical signals over line-of-sight (LoS) pathways and a wireless radio frequency (RF) network configured to transmit RF signals over RF pathways including non-line-of-sight (NLoS) pathways, a method of providing a communication service to a subscriber, the method comprising:
ascertaining plural possible Classes of Service (CoSs) that can be provided to the subscriber using at least one of the FSO and RF networks;
comparing respective projected costs of the plural possible CoSs; and
selecting a CoS to provide to the subscriber from among the plural possible CoSs, based at least in part on the comparison of the respective projected costs of the plural possible CoSs.

9. The method of claim 8, wherein:
the method further comprises determining a location of the subscriber in relation to at least one of the FSO and RF networks; and
the ascertaining step includes ascertaining the plural possible Classes of Service (CoSs) based at least in part on the subscriber's determined location.

10. The method of claim 9, wherein the location determining step includes:
considering a range of a cluster of transceivers in at least one of the FSO and RF networks; and
monitoring a distance of the subscriber to the cluster of transceivers.

11. The method of claim 8, further comprising:
providing a CoS involving the RF network if the selecting step includes selecting a CoS requiring voice transmission.

12. The method of claim 8, further comprising:
providing a CoS involving the RF network if the selecting step includes selecting a CoS requiring data transmission.

13. The method of claim 8, further comprising:
providing a CoS involving the FSO network if the selecting step includes selecting a CoS requiring video transmission.

14. The method of claim 8, further comprising:
providing a CoS involving the RF network if the selecting step includes selecting a CoS requiring voice transmission;
providing a CoS involving the RF network if the selecting step includes selecting a CoS requiring data transmission; and
providing a CoS involving the FSO network if the selecting step includes selecting a CoS requiring video transmission.

15. The method of claim 8, further comprising:
communicating high data rate bursts using the FSO network when subscriber has a velocity of zero in relation to a transceiver of the FSO network.

16. The method of claim 8, wherein:
the RF network is a WiMAX network.

17. The method of claim 8, wherein the selecting step includes:
selecting a CoS to provide to the subscriber from among the plural possible CoSs, based at least in part on a previously stored subscriber preference instructing that a less costly CoS should be provided despite availability of a higher bandwidth CoS among the plural possible CoSs ascertained in the ascertaining step.

18. A computer readable medium encoded with computer executable code or computer executable instructions that, when executed, causes a computer to perform the method of claim 8.

* * * * *